3,282,130
SAFETY DEVICE FOR MECHANICAL POWER
TRANSMISSION MECHANISMS
Masaharu Nishimura, Kodaira-shi, Japan, assignor to
Kabushiki Kaisha Hitachi Seisakusho, Tokyo-to, Japan,
a joint-stock company of Japan
Filed June 3, 1964, Ser. No. 372,233
Claims priority, application Japan, June 5, 1963,
(utility model) 38/40,834
1 Claim. (Cl. 74—757)

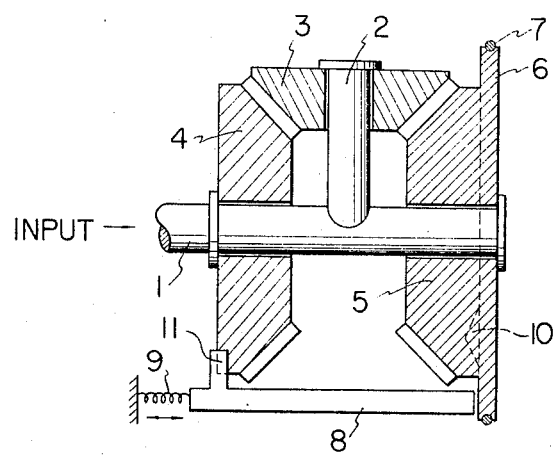

This invention relates to improvements in safety devices for mechanical power transmission mechanisms.

An example of the need for a safety device of the type to which the invention relates is to be found in continuous servomechanisms of devices such as an automatic null-balancing recorder. When an excessive input signal enters an automatic null-balancing recorder of general type, a servomotor starts to rotate continuously, but the operational range of the recording pen and the pointer is held within a certain definite span. Accordingly, it is necessary to provide between the input shaft and the output shaft a safety mechanism which will stop the output shaft driving the pen and the pointer within a certain definite rotational angle corresponding to the operational range of the pen and pointer. For this purpose, a common practice has been to provide a frictional coupling section in one part of the power transmission mechanism between the input and output shafts, thereby to accomplish transmission of power from the input shaft side to the output shaft side by utilizing the coupling force (resistance to slipping) of this frictional coupling section. By this means, when the output shaft reaches the limiting rotational angle, the rotation of the output shaft is forcibly stopped, and any further rotation of the input shaft merely causes slippage in the frictional coupling, and no further abnormal transmission of power is accomplished.

However, in such arrangements wherein frictional coupling is utilized, the frictional coupling force is unstable. Consequently, there arises the disadvantageous possibility of excessive slippage preventing attainment of the required torque under normal load conditions or, conversely, of excessive frictional resistance, and even seizure, of the coupling, which thereby becomes incapable of functioning as a safety device. Furthermore, such a frictional coupling device has disadvantages such as an upper limit to the magnitude of transmitted torque and the problem of wear of the contacting parts of the frictional coupling.

It is a general object of the present invention to provide a new and original safety device wherein the problems associated with conventional safety devices as mentioned above are solved.

With the foregoing object and other objects in view, the invention resides in the novel arrangement and construction of parts, as hereinafter described in detail, wherein the operational principle of a differential gear mechanism is utilized.

Briefly and generally described, the invention contemplates the provision of a safety device consisting essentially of a differential gear mechanism of the type wherein an input shaft and an output shaft are disposed in coaxial arrangement, and an intermediate gear supported rotatably on an arm fixed to and rotating together with the input shaft is caused to mesh simultaneously with an output gear fixed to the output shaft and with an idler gear capable of freely rotating about the input shaft or the output shaft, the aforesaid safety device being characterized by the additional provision, in said differential gear mechanism, of locking means to stop the rotation of the idler gear until the output gear (or the output shaft) reaches a restrictive rotational angle and unlocking means which, when the rotational angle of the output gear (or the output shaft) reaches the restrictive rotational angle, operates for the first time to cause the rotation of the idler to become free.

The specific nature, principle, and details of the invention will be more clearly apparent by reference to the following description with respect to a preferred embodiment of the safety device according to the invention, taken in conjunction with the accompanying drawing in which the single figure is a simplified sectional view showing the embodiment.

Referring to the drawing, the rotation of a rotating input shaft 1 directly causes rotation of an arm 2 fixed perpendicularly to the input shaft 1 and supporting on its outer end an intermediate gear 3 which is free to rotate thereabout and is meshed with both an idler gear 4 supported in a freely rotatable manner about the output gear 5 supported coaxially with the idler gear 4. A drive cord pulley 6 is secured flush against and coaxially with the ouptut gear 5 and drives a drive cord passed around its periphery.

While the output gear 5 is in a state wherein it has not reached the restrictive rotational angle, the idler gear 4 is stopped and locked from rotating by a stop 8 caused by a spring 9 to be engaged with a notch 11 provided in the idler gear 4. Consequently, the rotation of the input shaft 1 directly causes the intermediate gear 3, as it meshes with, and rolls around, the stopped idler gear 4, to revolve about the shaft 1. As a result, the output gear 5 rotates proportionally to the rotational angle of the input shaft 1 to drive the drive cord 7.

Then, when the output reaches the restrictive rotational angle, a cam projection 10 provided on the side surface of the pulley 6 strikes against a part of the stop 8 and, overcoming the force of the spring 9, pushes the stop 8 out of engagement with the notch 11 in the idler gear 4, which thereby becomes free to rotate about the input shaft 1.

At this time, since the projection 10 is pressed against the stop 8, the output gear 5 is prevented from rotating further, and, this time, the idler gear 4 begins idling rotation in accordance with the rotation of the input shaft 1. As a result, no further rotational torque of abnormal magnitude is transmitted to the output side.

As described above in detail, in the safety device of this invention, the input rotational torque can be transmitted stably and positively to the output shaft until the rotational angle of the output shaft reaches the restrictive rotational angle, and when this restrictive rotational angle is reached, the idler gear is released to rotate freely, whereby further transmission of mechanical power to the output side is stopped. Accordingly, since application of abnormal forces on the output and input is thereby prevented, the risk of damage to and impairment of the device is completely eliminated.

The safety device of this invention has the further advantageous feature of having no frictional coupling parts, whereby the range of transmittable magnitudes of torque is greatly extended. Accordingly, the safety device of this invention can be used effectively between the input and output shafts of mechanical power transmission mechanisms in which the rotational angle of the output shaft is to be restricted.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claim.

I claim:

In a differential gear mechanism comprising an input shaft; an arm fixed at right angles to said input shaft; an idler gear and an output gear, both supported about said input shaft in a freely rotatable manner; and an intermediate gear rotatably supported by said arm and meshed with both said idler gear and output gear; a mechanical power transmission comprising locking means capable of locking the rotation of said idler gear until said output gear reaches a predetermined restrictive angle of rotation; and unlocking means rendering said idler gear rotatable immediately upon the rotation of said output gear reaching said predetermined restrictive angle of rotation; said locking means consisting of a stop urged onto a notch, provided on said idler gear, by means of a spring; and said unlocking means comprising a projection capable of disengaging said stop from said notch against the pushing force of said spring when said output gear reaches said predetermined restrictive angle of rotation.

References Cited by the Examiner
UNITED STATES PATENTS

| | | | |
|---|---|---|---|
| 1,377,844 | 5/1921 | McCutchen et al. | 74—757 |
| 2,834,843 | 5/1958 | Anger | 74—557 |

DAVID I. WILLIAMOWSKY, *Primary Examiner.*

DON A. WAITE, *Examiner.*

R. J. BIRD, J. A. WONG, *Assistant Examiners.*